(12) United States Patent  (10) Patent No.: US 8,327,774 B1
Rivera  (45) Date of Patent: Dec. 11, 2012

(54) PORTABLE STEERING WHEEL MOUNTED TABLE

(76) Inventor: Michael A. Rivera, Carrollton, TX (US)

( * ) Notice: Subject to any disclaimer, the term of this patent is extended or adjusted under 35 U.S.C. 154(b) by 0 days.

(21) Appl. No.: 13/112,642

(22) Filed: May 20, 2011

(51) Int. Cl.
A47B 23/00 (2006.01)
(52) U.S. Cl. ...................................... 108/44; 108/50.02
(58) Field of Classification Search .................... 108/43, 108/44, 152, 23, 25, 26, 38, 67, 77, 81, 45, 108/50.01, 50.02; 248/444; 224/276, 400
See application file for complete search history.

(56) References Cited

U.S. PATENT DOCUMENTS

| | | | | |
|---|---|---|---|---|
| 151,090 | A * | 5/1874 | Chapman | 108/43 |
| 1,883,714 | A * | 10/1932 | Gray | 224/276 |
| 2,746,821 | A * | 5/1956 | Schroeder | 108/44 |
| 2,866,381 | A * | 12/1958 | Alldredge | 108/44 |
| 4,094,256 | A * | 6/1978 | Holper et al. | 108/50.02 |
| 4,832,241 | A * | 5/1989 | Radcliffe | 108/44 |
| 4,892,334 | A * | 1/1990 | Sinclair | 108/42 |
| 5,116,011 | A * | 5/1992 | Smith | 108/27 |
| 5,177,665 | A | 1/1993 | Frank et al. | |
| 5,320,321 | A * | 6/1994 | Muncada | 248/443 |
| 5,324,076 | A * | 6/1994 | Nieradka | 248/441.1 |
| 5,386,785 | A | 2/1995 | Naor | |
| 5,390,608 | A * | 2/1995 | McLaren et al. | 108/44 |
| 5,487,521 | A | 1/1996 | Callahan | |
| 5,845,585 | A | 12/1998 | Meeus et al. | |
| 5,979,337 | A * | 11/1999 | Clark et al. | 108/43 |
| 6,036,158 | A | 3/2000 | Raasch | |
| D437,273 | S | 2/2001 | Chen | |
| 6,192,806 | B1 | 2/2001 | Chen | |
| 6,279,800 | B1 * | 8/2001 | Lee | 224/276 |
| 6,412,425 | B1 | 7/2002 | Chen | |
| D472,728 | S * | 4/2003 | Harris et al. | D6/406.3 |
| 6,672,557 | B1 * | 1/2004 | Jackson | 108/23 |
| 6,928,932 | B1 * | 8/2005 | Ferrill | 108/23 |
| 6,997,117 | B1 * | 2/2006 | Mitjans | 108/23 |
| 7,096,797 | B2 * | 8/2006 | Sharpe et al. | 108/43 |
| 7,106,014 | B1 * | 9/2006 | Mastalir et al. | 108/44 |
| 7,334,768 | B1 * | 2/2008 | Lum | 248/444 |
| 8,051,783 | B1 * | 11/2011 | Hoskinson | 108/23 |
| 8,079,312 | B2 * | 12/2011 | Long | 108/44 |
| 2006/0107878 | A1 | 5/2006 | Cassata | |
| 2009/0084291 | A1 | 4/2009 | Long | |
| 2011/0056412 | A1 * | 3/2011 | Grammer et al. | 108/25 |

* cited by examiner

*Primary Examiner* — Jose V Chen (57) ABSTRACT

A portable steering wheel mounted table provides a lighted writing surface and item storage in the cabin area of a vehicle. The table includes a housing having a first section pivotally coupled to a second section. A first surface of the first section and a first surface of the second section are coplanar forming a writing surface in an open position. The first surface of the first section and the first surface of the second section face each other in a closed position. A first mounting strap is coupled to the housing and configured for being coupled to a steering wheel. Support legs are coupled to the housing and have curved distal portions configured for resting on the steering wheel. Lights are coupled to the housing by a plurality of positionable arms.

15 Claims, 8 Drawing Sheets

PORTABLE STEERING WHEEL MOUNTED TABLE

BACKGROUND OF THE DISCLOSURE

Field of the Disclosure

The disclosure relates to vehicle table devices and more particularly pertains to a new vehicle table device for providing a lighted writing surface and item storage in the cabin area of a vehicle.

SUMMARY OF THE DISCLOSURE

An embodiment of the disclosure meets the needs presented above by generally comprising a housing having a first section pivotally coupled to a second section. A first surface of the first section and a first surface of the second section are coplanar forming a writing surface in an open position. The first surface of the first section and the first surface of the second section face each other in a closed position. A first mounting strap is coupled to the housing and configured for being coupled to a steering wheel. Support legs are coupled to the housing and have curved distal portions configured for resting on the steering wheel. Lights are coupled to the housing by a plurality of positionable arms.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
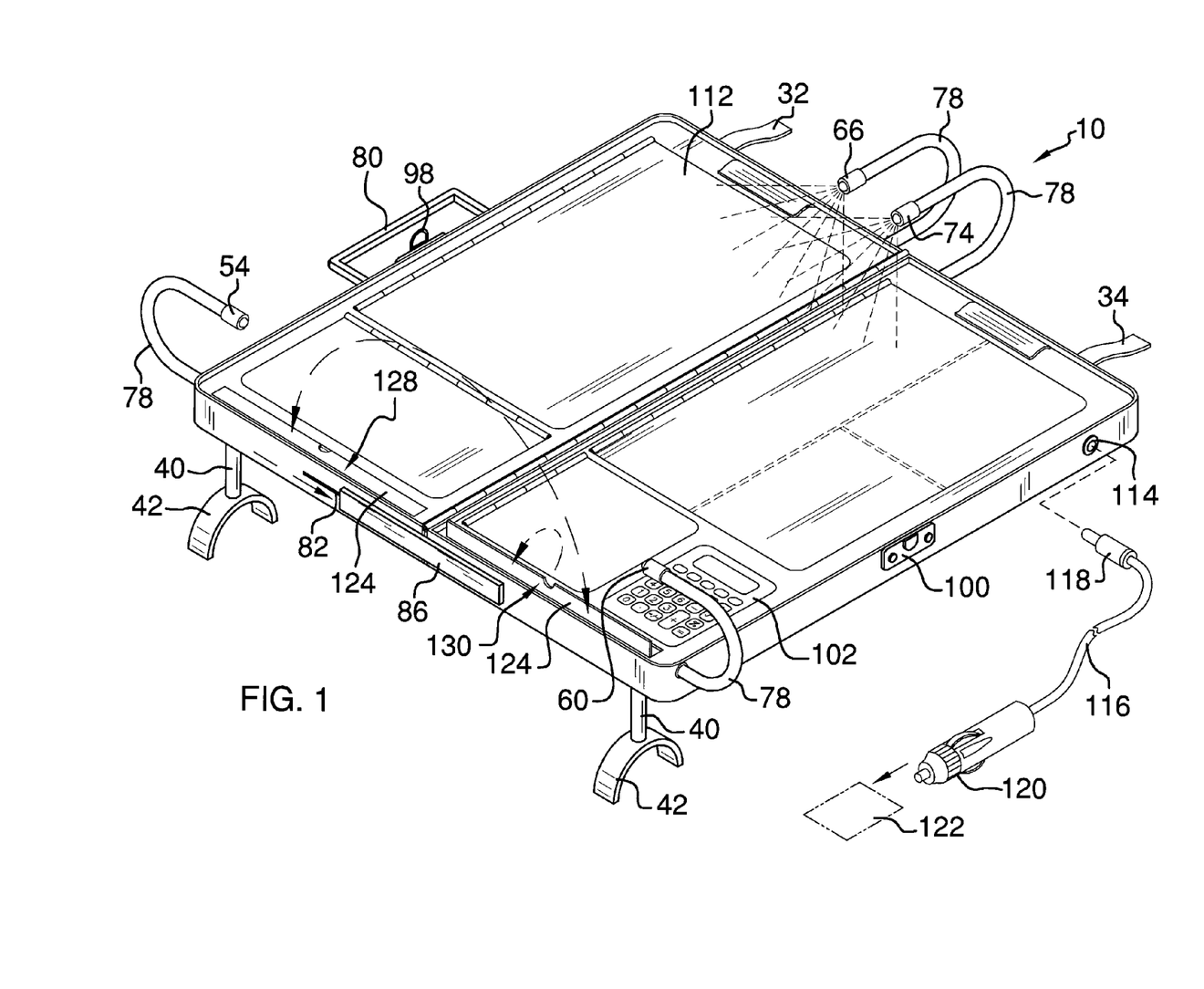
FIG. 1 is a front bottom side perspective view of a portable steering wheel mounted table according to an embodiment of the disclosure.
Figure 2:
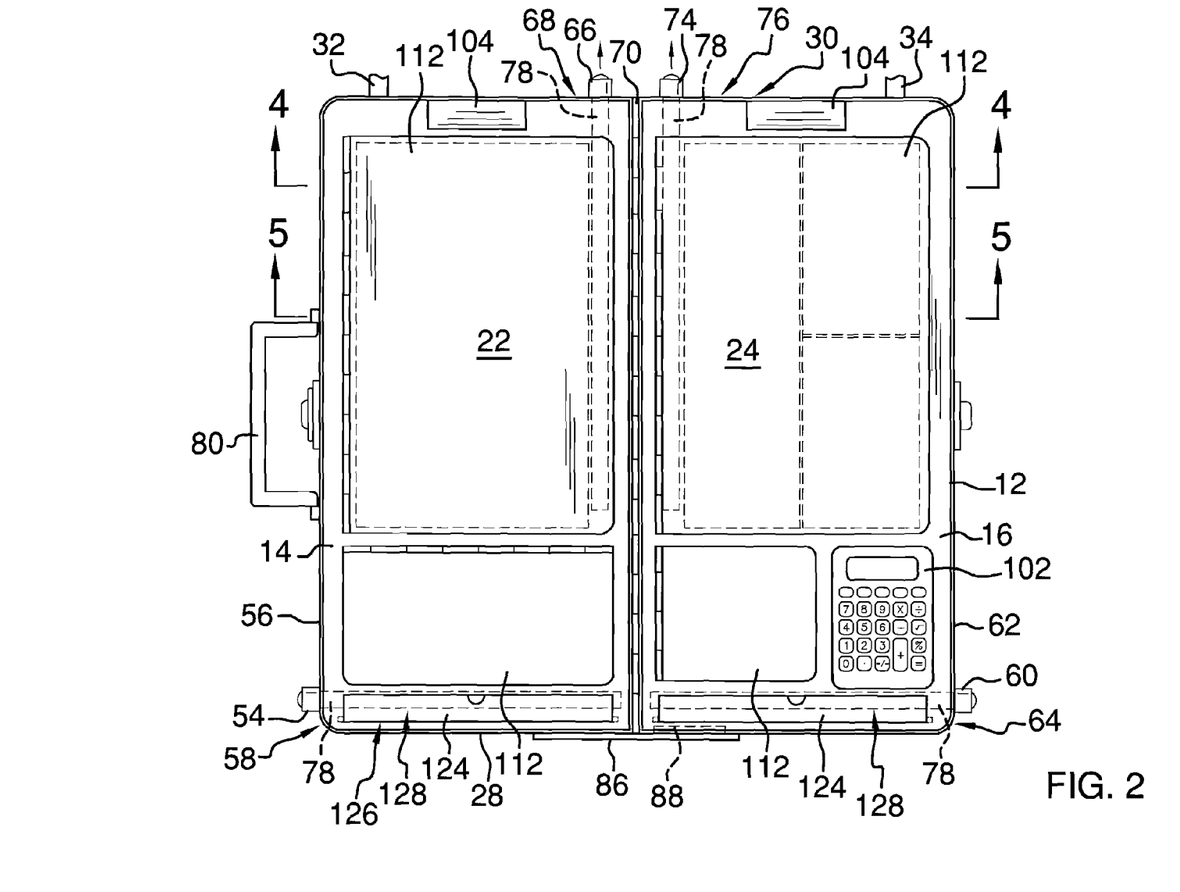
FIG. 2 is a front view of an embodiment of the disclosure.
Figure 3:
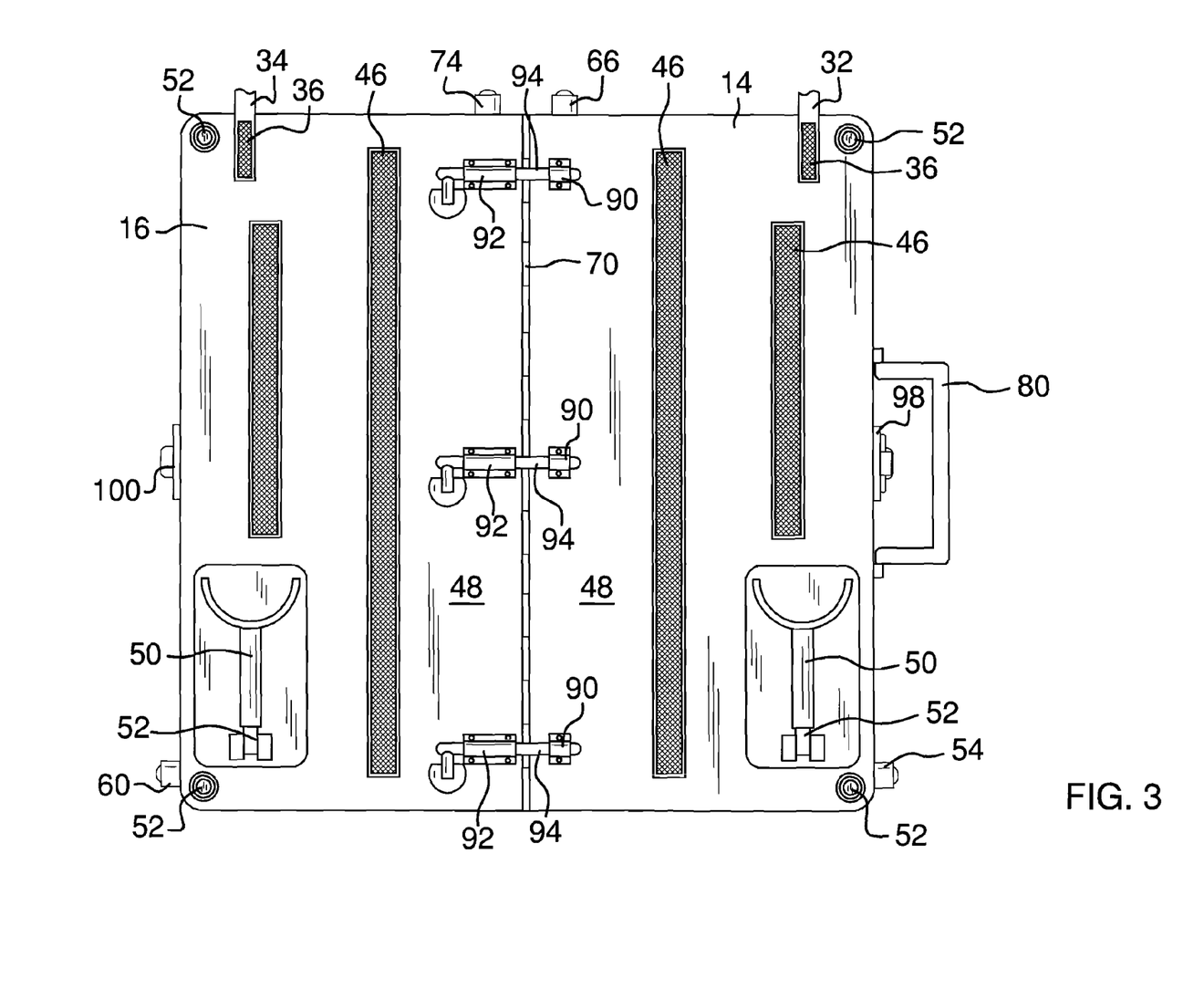
FIG. 3 is a back view of an embodiment of the disclosure.
Figure 4:
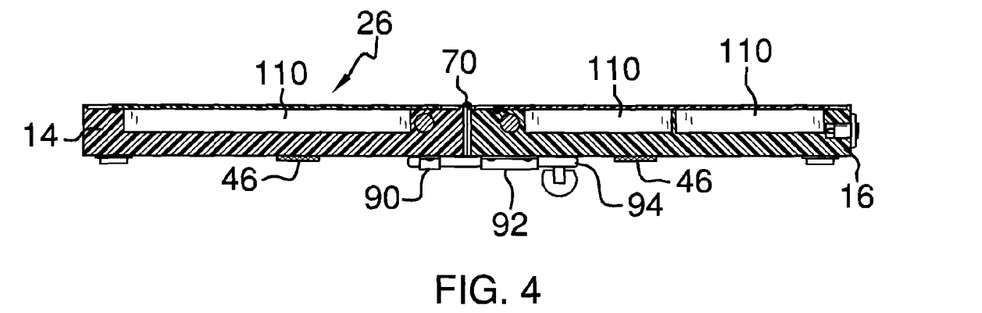
FIG. 4 is a cross-sectional view of an embodiment of the disclosure taken along line 4-4 of FIG. 2.
Figure 5:
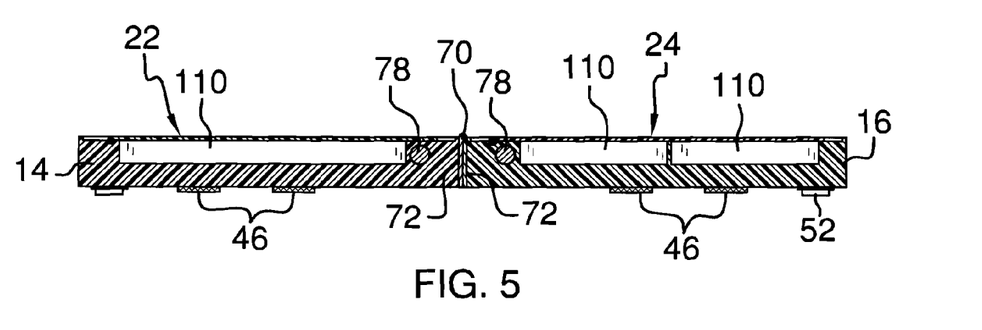
FIG. 5 is a cross-sectional view of an embodiment of the disclosure taken along line 5-5 of FIG. 2.
Figures 6, 7:
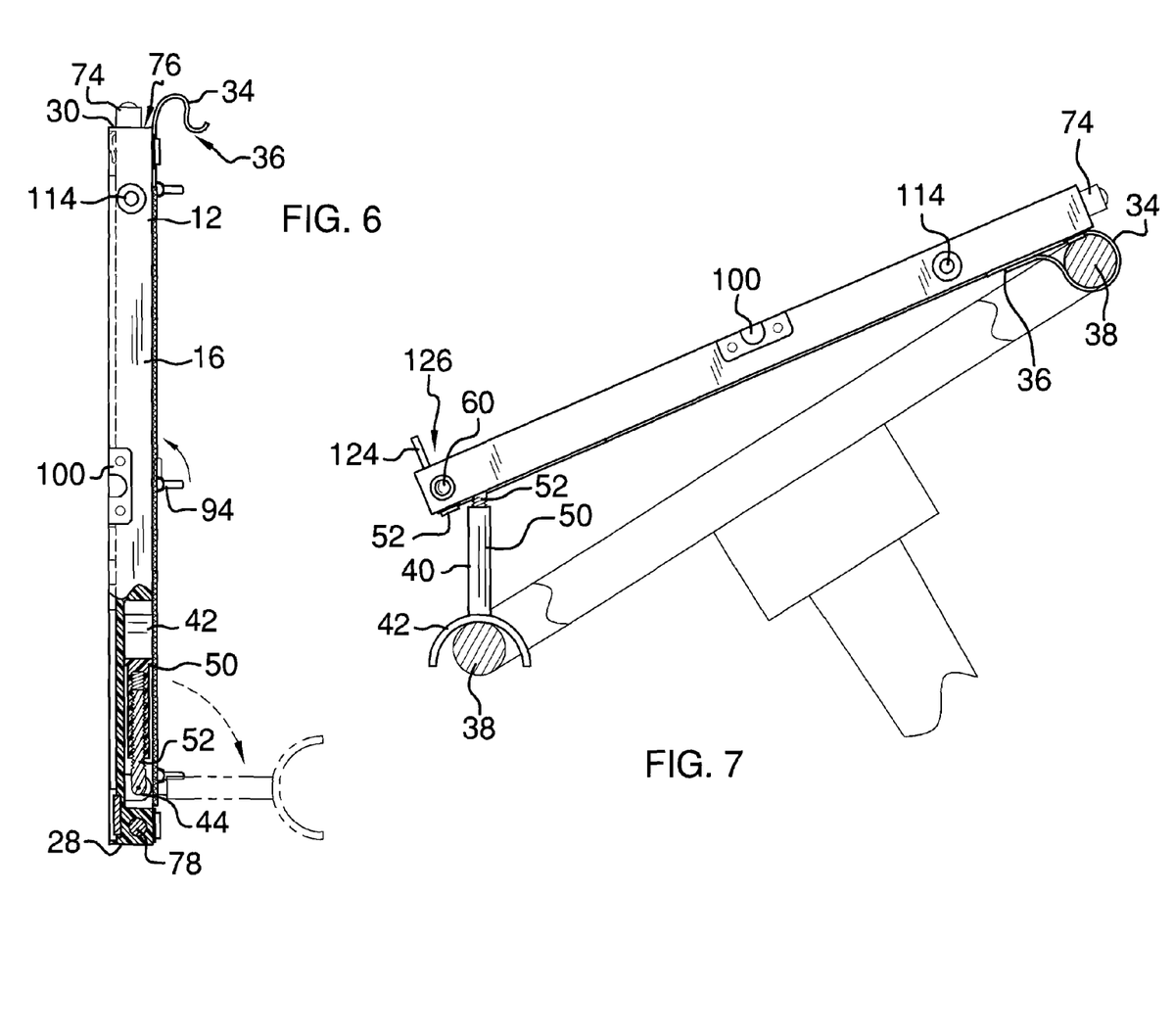
FIG. 6 is a partial cut-away side view of an embodiment of the disclosure.
FIG. 7 is a side view of an embodiment of the disclosure in use.
Figure 8:
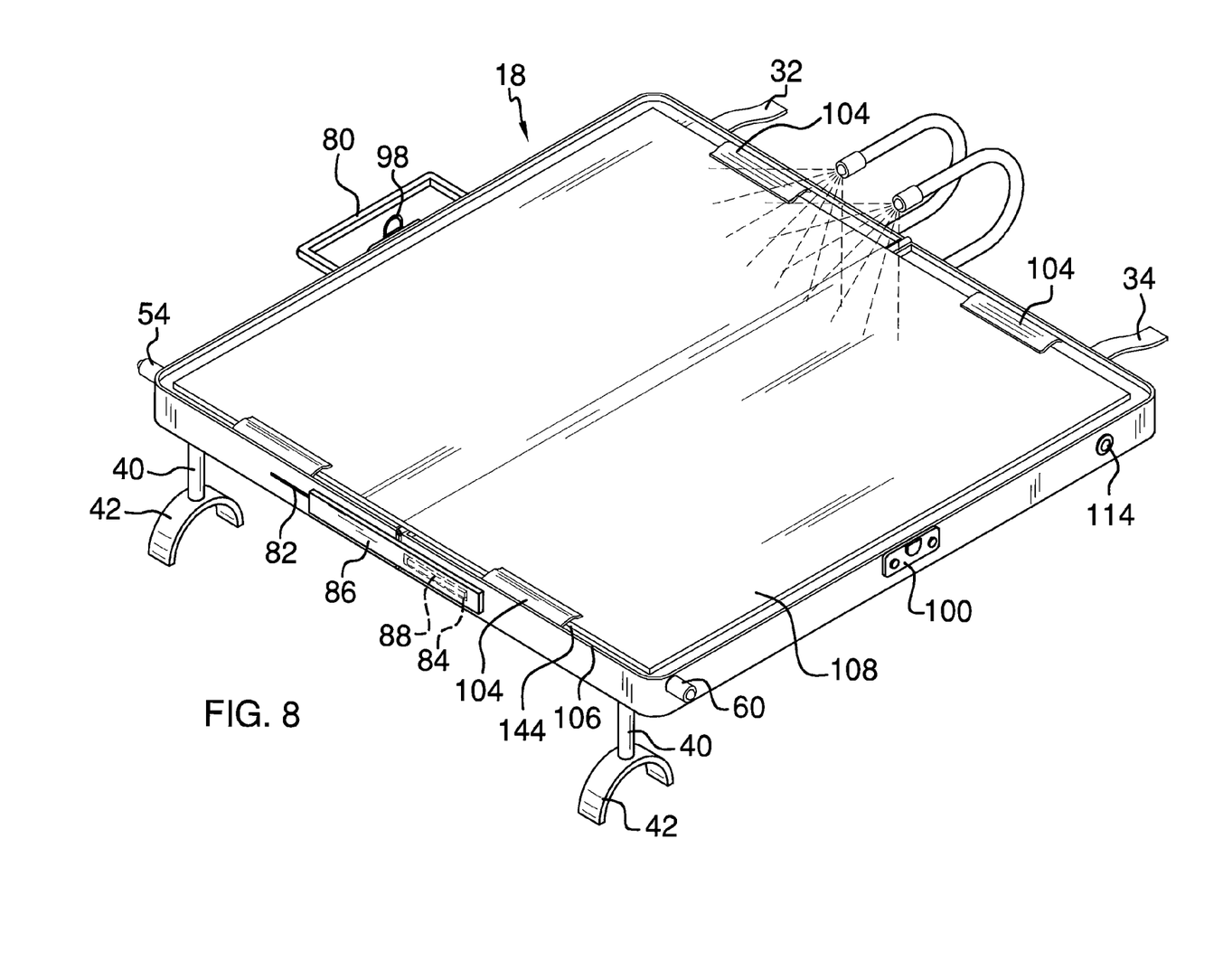
FIG. 8 is a front bottom side perspective view of an embodiment of the disclosure.
Figure 9:
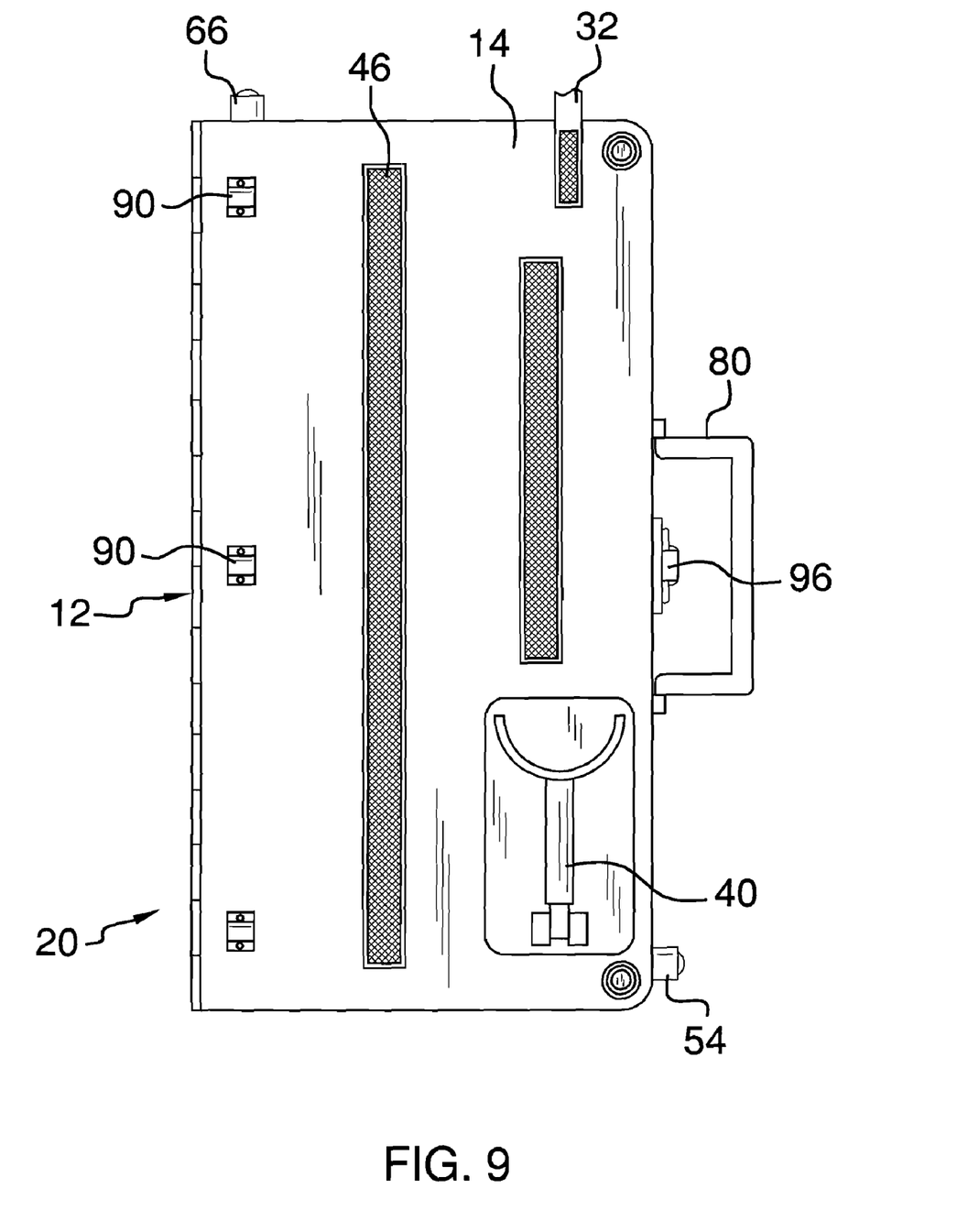
FIG. 9 is a front view of an embodiment of the disclosure in a closed position.
Figure 10:
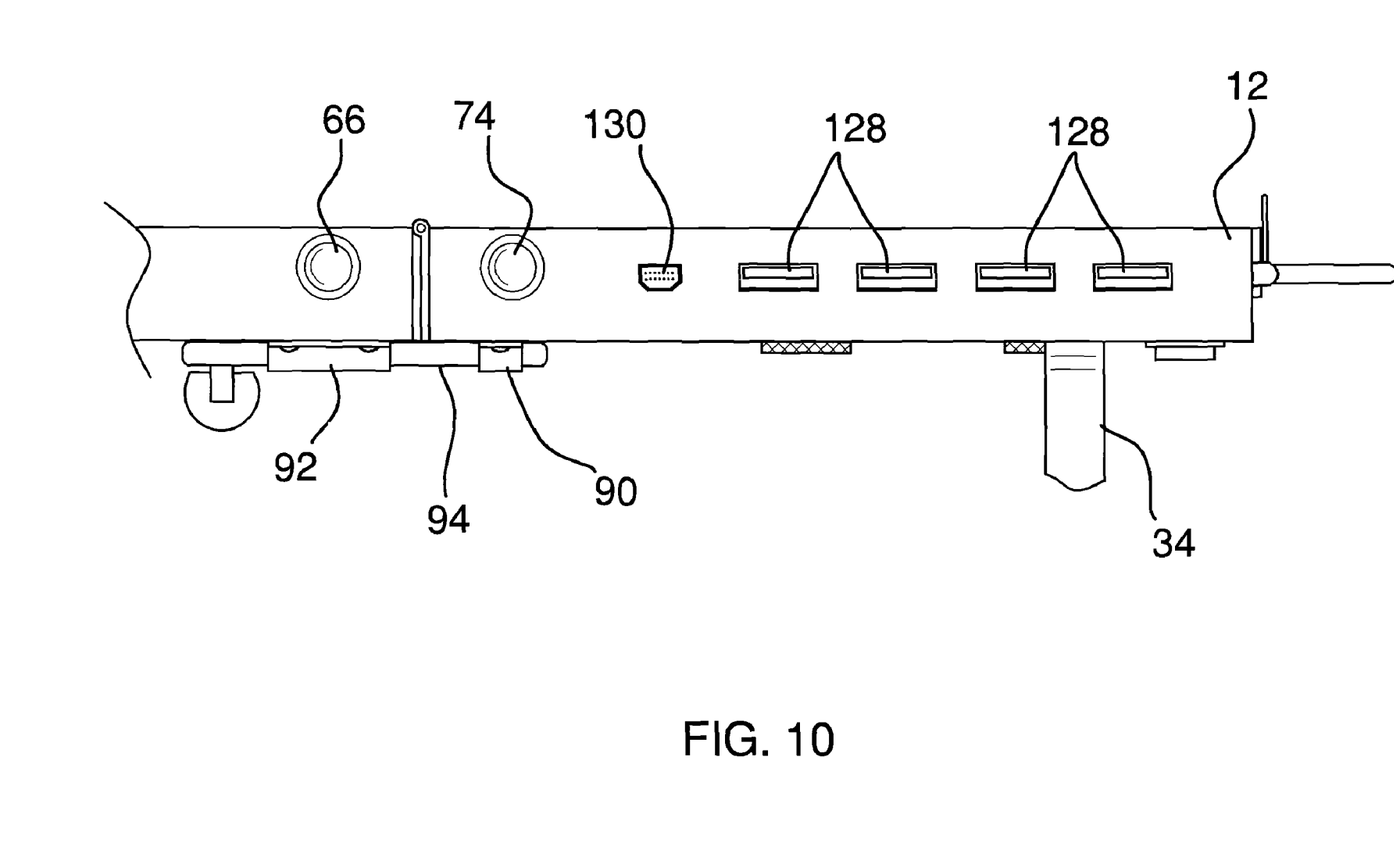
FIG. 10 is a partial top view of an embodiment of the disclosure.

With reference now to the drawings, and in particular to FIGS. 1 through 10 thereof, a new vehicle table device embodying the principles and concepts of an embodiment of the disclosure and generally designated by the reference numeral 10 will be described.

As best illustrated in FIGS. 1 through 10, the portable steering wheel mounted table 10 generally comprises a housing 12 having a first section 14 pivotally coupled to a second section 16. The housing 12 is pivotable between an open position 18 and a closed position 20. A first surface 22 of the first section 14 and a first surface 24 of the second section 16 are coplanar forming a writing surface 26 in the open position 18. The first surface 22 of the first section 14 and the first surface 24 of the second section 16 face each other in the closed position 20. The housing 12 has a lower end 28 and an upper end 30 opposite the lower end 28. A piano hinge 70 extends along adjacent edges 72 of the first section 14 and the second section 16 of the housing 12 between the upper end 30 and the lower end 28 of the housing 12. In the closed position 20 the housing has a width between 20 and 30 centimeters and a height between 50 and 61 centimeters.

A first mounting strap 32 is coupled to the housing 12 on the first section 14. A second mounting strap 34 may be coupled to the second section 16. The first mounting strap 32 and the second mounting strap 34 may employ hook and loop fastener 36 such that mounting strap 32 and mounting strap 34 are each configured for being coupled to a steering wheel 38. A plurality of support legs 40 are also coupled to the housing 12. The support legs 40 each have a curved distal portion 42 configured for resting on the steering wheel 38 to support the housing 12 on the steering wheel 38. The support legs 40 may be attached using a swivel connector 44 to facilitate twisting and storing the support legs 40 against the housing 12 when not in use. The support legs 40 may also be retractable utilizing a sleeve portion 50 and a threaded portion 52 for adjustment of a length of the support leg 40. Additional sections 46 of hook and loop fastener may be provided on a lower surface 48 of the opened housing 12 to facilitate stable positioning of the writing surface 26 during use. Snaps 52 may also be positioned on the housing 12 to facilitate attachment of securing straps or the like to the housing 12 if so desired.

A first lower light 54 is positioned on and extendable from a longitudinal side 56 of the first section 14 of the housing 12. The first lower light 54 is positioned proximate a lower edge 58 of the first section 14 of the housing 12. Similarly, a second lower light 60 is positioned on and extendable from a longitudinal side 62 of the second section 16 of the housing 12. The second lower light 60 is positioned proximate a lower edge 64 of the second section 16 of the housing 12. A first upper light 66 is positioned on and extendable from an upper face 68 of the first section 14 of the housing 12. The first upper light 66 may be positioned proximate the piano hinge 70. A second upper light 74 is positioned on and extendable from an upper face 76 of the second section 16 of the housing 12. The second upper light 74 may also be positioned proximate the piano hinge 70. The first lower light 54, second lower light 60, first upper light 66, and second upper light 74 may be LED type lights and are each coupled to an associated positionable arm 78. Each positionable arm 78 is coupled to and extends between an associated one of the first upper lower light 54, second lower light 60, first upper light 66 and second upper light 74 and the housing 12. Each positionable arm 78 is selectively retractable into the housing 12 and is bendable to and retains a desired shape.

A handle 80 is coupled to the first section 14 of the housing 12. A first slot 82 is provided in the first section 14 of the housing 12. A second slot 84 is provided in the second section 16 of the housing 12. The second slot 84 is aligned with the first slot 82 when the first section 14 and the second section 16 are in the open position 18. A locking panel 86 is coupled to and slidable in the first slot 82. The locking panel 86 has a protrusion 88 that is slidable into the second slot 84 to engage the second section 16 of the housing 12. Thus, the second section 16 is held in a static position relative to the first section 14 when desired.

Alternatively to or in combination with the locking panel 86, a plurality of receivers 90 are coupled to the first section 14 of the housing 12. A plurality of collars 92 are coupled to the second section 16 of the housing 12. A plurality of slide bars 94 are each coupled to and extendable from an associated one of the collars 92 into an associated one of the receivers 90. The bars 94 extend across the hinge 70. Thus, the housing 12 is prevented from being pivoted out of the open position 18 when the slide bars 94 are inserted into the receivers 90. A latch 96 has a first portion 98 coupled to the first section 14 of the housing 12 and a second portion 100 coupled to the second section 16 of the housing 12. The first portion 98 of the latch 96 is selectively engageable to the second portion 100 of the latch 96. Thus, the first section 14 of the housing 12 and the second section 16 of the housing 12 are held in the closed position 20 as desired.

A calculator 102 is coupled to the housing 12. The calculator 102 is positioned on the writing surface 26 and may be powered by a self-contained solar cell. A plurality of clips 104 may be coupled to the housing 12 and positioned on an upper perimeter edge 106 of the writing surface 26. Clips 104 may also be positioned on a lower perimeter edge 144 of the writing surface 26. A planar member 108 is selectively coupled to the clips 104 as desired. The planar member 108 is sized to cover the writing surface 26 and the calculator 102 when the planar member 108 is coupled to the clips 104. The planar member 108 may be used to provide a completely smooth surface or to divert spills away from the writing surface 26 of the housing 12. A plurality of chambers 110 is positioned in the housing 12 to provide storage for paper, pencils, pens, small staplers, paper clips, and the like. A plurality of pivotable doors 112 is provided. The doors 112 are positioned in the writing surface 26 for selectively covering or permitting access to the chambers 110.

A power port 114 is coupled to the housing 12. The power port 114 is electrically coupled to the first lower light 54, second lower light 60, first upper light 66, and second upper light 74. The power port 114 may also be operationally coupled to the calculator 102 or any other electronic device that may be incorporated into the housing 12. A power cord 116 has a first end 118 engageable to the power port 114 and a second end 120 configured for electrically coupling to a vehicle power outlet 122. Thus, the first lower light 54, second lower light 60, first upper light 66, and second upper light 74 are electrically coupled to the power outlet 122 for illuminating the first lower light 54, second lower light 60, first upper light 66, and second upper light 74. An alternative power port 130 is positioned in the housing 12 near the second upper light 74. A plurality of USB ports 128 is coupled to the housing 12.

A pair of lip panels 124 is pivotally coupled to the housing 12. The lip panels 124 are positioned proximate a lower edge 126 of the writing surface 26. The lip panels 124 are pivotable between a retracted position 128 and an extended position 130 to assist in retaining items in the area of the writing surface 26.

In use, the housing 12 is opened by pivoting the first section 14 and the second section 16. The first mounting strap 32 and second mounting strap 34 are secured around the steering wheel 38. Support legs 40 are adjusted and positioned to support the housing 12 on the steering wheel 38. The writing surface 26, calculator 102 and chambers 110 are all accessible. The housing 12 is locked into the open position 18 if desired using the locking panel 86 or slide bars 94. The first lower light 54, second lower light 60, first upper light 66, and second upper light 74 may all be extended from the housing 12 and positioned as desired to provide light as needed during use.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A table assembly for mounting on a steering wheel, said assembly comprising:
   a housing having a first section pivotally coupled to a second section, said housing being pivotable between an open position and a closed position, wherein a first surface of said first section and a first surface of said second section are coplanar forming a writing surface in said open position, wherein said first surface of said first section and said first surface of said second section face each other in said closed position;
   a first mounting strap coupled to said housing, said mounting strap being configured for being coupled to the steering wheel;
   a plurality of support legs coupled to said housing, said support legs having curved distal portions configured for resting on the steering wheel to support said housing on the steering wheel;
   a plurality of lights coupled to said housing; and
   a plurality of positionable arms, each said positionable arm being bendable to a retain a desired shape, each said positionable arm being coupled to and extending between an associated one of said lights and said housing, each said positionable arm being insertable into said housing.

2. The assembly of claim 1, further including a handle coupled to said first section of said housing.

3. The assembly of claim 1, further comprising:
   said housing having a lower end and an upper end opposite said lower end; and
   a piano hinge extending along adjacent edges of said first section and said second section of said housing between said upper end and said lower end of said housing.

4. The assembly of claim 3, further comprising:
   a first slot in said first section of said housing;
   a second slot in said second section of said housing, said second slot being aligned with said first slot when said first section and said second section are in said open position; and
   a locking panel being coupled to and slidable in said first slot, said locking panel having a protrusion slidable into said second slot to engage said second section of said housing whereby said second section is held in a static position relative to said first section.

5. The assembly of claim 1, further comprising:

a plurality of receivers coupled to said first section of said housing;

a plurality of collars coupled to said second section of said housing; and a plurality of slide bars, each slide bar being coupled to and extendable from an associated one of said collars into an associated one of said receivers whereby said first housing is prevented from being pivoted out of said open position when said slide bars are inserted into said receivers.

6. The assembly of claim 1, further comprising:

a first lower light of said plurality of lights being positioned to extend from a longitudinal side of said first section of said housing, said first lower light being positioned proximate a lower edge of said first section of said housing; and a second lower light of said plurality of lights being positioned to extend from a longitudinal side of said second section of said housing, said second lower light being positioned proximate a lower edge of said second section of said housing.

7. A table assembly for mounting on a steering wheel, said assembly comprising:

a housing having a first section pivotally coupled to a second section, said housing being pivotable between an open position and a closed position, wherein a first surface of said first section and a first surface of said second section are coplanar forming a writing surface in said open position, wherein said first surface of said first section and said first surface of said second section face each other in said closed position;

a first mounting strap coupled to said housing, said mounting strap being configured for being coupled to the steering wheel;

a plurality of support legs coupled to said housing, said support legs having curved distal portions configured for resting on the steering wheel to support said housing on the steering wheel;

a plurality of lights coupled to said housing;

a plurality of positionable arms, each said positionable arm being bendable to a retain a desired shape, each said positionable arm being coupled to and extending between an associated one of said lights and said housing;

said housing having a lower end and an upper end opposite said lower end;

a piano hinge extending along adjacent edges of said first section and said second section of said housing between said upper end and said lower end of said housing;

a first upper light of said plurality of lights being positioned to extend from an upper face of said first section of said housing, said first upper light being positioned proximate said piano hinge; and a second upper light of said plurality of lights being positioned to extend from an upper face of said second section of said housing, said second upper light being positioned proximate said piano hinge.

8. The assembly of claim 1, further including a latch having a first portion coupled to said first section of said housing and a second portion coupled to said second section of said housing, said first portion of said latch being selectively engageable to said second portion of said latch whereby said first section of said housing and said second section of said housing are held in said closed position.

9. The assembly of claim 1, further including a calculator coupled to said housing, said calculator being positioned on said writing surface.

10. The assembly of claim 1, further including a plurality of clips coupled to said housing, said clips being positioned on an upper perimeter edge of said writing surface.

11. The assembly of claim 10, further including a planar member selectively coupled to said clips, said planar member being sized to cover said writing surface when said planar member is coupled to said clips.

12. The assembly of claim 1, further comprising:

a plurality of chambers positioned in said housing; and a plurality of pivotable doors positioned in said writing surface for selectively accessing said chambers.

13. The assembly of claim 1, further comprising:

a power port coupled to said housing, said power port being electrically coupled to said lights; and a power cord having a first end engageable to said power port and a second end configured for electrically coupling to a vehicle power outlet whereby said lights are electrically coupled to said power outlet for illuminating said lights.

14. The assembly of claim 1, further including a pair of lip panels pivotally coupled to said housing, said lip panels being positioned proximate a lower edge of said writing surface, said lip panels being pivotable between a retracted position and an extended position.

15. A table assembly for mounting on a steering wheel, said assembly comprising:

a housing having a first section pivotally coupled to a second section, said housing being pivotable between an open position and a closed position, wherein a first surface of said first section and a first surface of said second section are coplanar forming a writing surface in said open position, wherein said first surface of said first section and said first surface of said second section face each other in said closed position, said housing having a lower end and an upper end opposite said lower end;

a first mounting strap coupled to said housing, said mounting strap being configured for being coupled to the steering wheel;

a plurality of support legs coupled to said housing, said support legs having curved distal portions configured for resting on the steering wheel to support said housing on the steering wheel;

a plurality of lights coupled to said housing;

a plurality of positionable arms, each said positionable arm being bendable to a retain a desired shape, each said positionable arm being coupled to and extending between an associated one of said lights and said housing, wherein each said positionable arm is insertable into said housing;

a handle coupled to said first section of said housing;

a piano hinge extending along adjacent edges of said first section and said second section of said housing between said upper end and said lower end of said housing;

a first slot in said first section of said housing;

a second slot in said second section of said housing, said second slot being aligned with said first slot when said first section and said second section are in said open position;

a locking panel being coupled to and slidable in said first slot, said locking panel having a protrusion slidable into said second slot to engage said second section of said housing whereby said second section is held in a static position relative to said first section;

a plurality of receivers coupled to said first section of said housing;

a plurality of collars coupled to said second section of said housing;

a plurality of slide bars, each slide bar being coupled to and extendable from an associated one of said collars into an associated one of said receivers whereby said first housing is prevented from being pivoted out of said open position when said slide bars are inserted into said receivers;

a first lower light of said plurality of lights being positioned to extend from a longitudinal side of said first section of said housing, said first lower light being positioned proximate a lower edge of said first section of said housing;

a second lower light of said plurality of lights being positioned to extend from a longitudinal side of said second section of said housing, said second lower light being positioned proximate a lower edge of said second section of said housing;

a first upper light of said plurality of lights being positioned to extend from an upper face of said first section of said housing, said first upper light being positioned proximate said piano hinge;

a second upper light of said plurality of lights being positioned to extend from an upper face of said second section of said housing, said second upper light being positioned proximate said piano hinge;

a latch having a first portion coupled to said first section of said housing and a second portion coupled to said second section of said housing, said first portion of said latch being selectively engageable to said second portion of said latch whereby said first section of said housing and said second section of said housing are held in said closed position;

a calculator coupled to said housing, said calculator being positioned on said writing surface;

a plurality of clips coupled to said housing, said clips being positioned on an upper perimeter edge of said writing surface;

a planar member selectively coupled to said clips, said planar member being sized to cover said writing surface when said planar member is coupled to said clips;

a plurality of chambers positioned in said housing;

a plurality of pivotable doors positioned in said writing surface for selectively accessing said chambers;

a power port coupled to said housing, said power port being electrically coupled to said lights;

a power cord having a first end engageable to said power port and a second end configured for electrically coupling to a vehicle power outlet whereby said lights are electrically coupled to said power outlet for illuminating said lights; and a pair of lip panels pivotally coupled to said housing, said lip panels being positioned proximate a lower edge of said writing surface, said lip panels being pivotable between a retracted position and an extended position.

* * * * *